US012694346B1

(12) United States Patent
    Gutierrez Keever et al.

(10) Patent No.: US 12,694,346 B1
(45) Date of Patent: Jul. 28, 2026

(54) MEMORY MANAGEMENT SYSTEM FOR APPOINTMENT SCHEDULING

(71) Applicant: SALESCLOSER TECHNOLOGIES INC., Vancouver (CA)

(72) Inventors: Alabin Jordan Carel Gutierrez Keever, North Vancouver (CA); Amir Ali Pourjabbari, Vancouver (CA); Ali Tajskandar, North Vancouver (CA); Luis Alejandro Medina Chávez, El Marqués (MX); Kara Racquel Kruzeniski, White Rock (CA)

(73) Assignee: SALESCLOSER HOLDINGS LTD., Vancouver (CA)

( * ) Notice: Subject to any disclaimer, the term of this patent is extended or adjusted under 35 U.S.C. 154(b) by 0 days.

(21) Appl. No.: 19/311,518

(22) Filed: Aug. 27, 2025

(51) Int. Cl.
    *G06Q 10/02* (2012.01)
    *G06Q 10/1093* (2023.01)
    *G10L 15/18* (2013.01)
    *G10L 15/26* (2006.01)

(52) U.S. Cl.
    CPC ......... *G06Q 10/02* (2013.01); *G06Q 10/1093* (2013.01); *G10L 15/1822* (2013.01); *G10L 15/26* (2013.01)

(58) Field of Classification Search
    CPC .... G06Q 10/02; G06Q 10/025; G10L 15/005; G10L 15/04; G10L 15/26
    See application file for complete search history.

(56) References Cited

U.S. PATENT DOCUMENTS

| | | | | |
|---|---|---|---|---|
| 2018/0239822 A1* | 8/2018 | Reshef | .................. | G06F 40/35 |
| 2023/0115098 A1* | 4/2023 | Miller | .................. | G06F 40/295 |
| | | | | 704/235 |
| 2024/0126440 A1* | 4/2024 | Stewart | ................. | G06F 3/0656 |
| 2025/0028579 A1* | 1/2025 | Mehmeri | ................ | H04L 51/02 |
| 2025/0069044 A1 | 2/2025 | Gupta et al. | | |
| 2025/0080372 A1* | 3/2025 | Dong | .................. | H04L 63/0884 |
| 2025/0124229 A1* | 4/2025 | Andreas | .................. | G06F 40/30 |

OTHER PUBLICATIONS

R. Sarikaya, "The Technology Behind Personal Digital Assistants: An overview of the system architecture and key components," in IEEE Signal Processing Magazine, vol. 34, No. 1, pp. 67-81, Jan. 2017, doi: 10.1109/MSP.2016.2617341 (Year: 2017).*

* cited by examiner

*Primary Examiner* — Michael P Harrington
(74) *Attorney, Agent, or Firm* — Jason A. Smith; Shumaker, Loop & Kendrick, LLP

(57) ABSTRACT

A system for AI-driven conversational appointment scheduling, including a natural language processing module configured to interpret user inputs related to appointment scheduling, a calendar integration module configured to access real-time availability data from one or more external calendars, an AI agent configured to engage in scheduling-related conversations with users and suggest available appointment slots based on the interpreted user inputs and the real-time availability data, and a scheduling module configured to book appointments based on user confirmations and implement a delay period before finalizing bookings to account for potential conflicts. The system enables seamless appointment scheduling through natural language interactions, real-time calendar synchronization, and conflict prevention mechanisms.

14 Claims, 4 Drawing Sheets

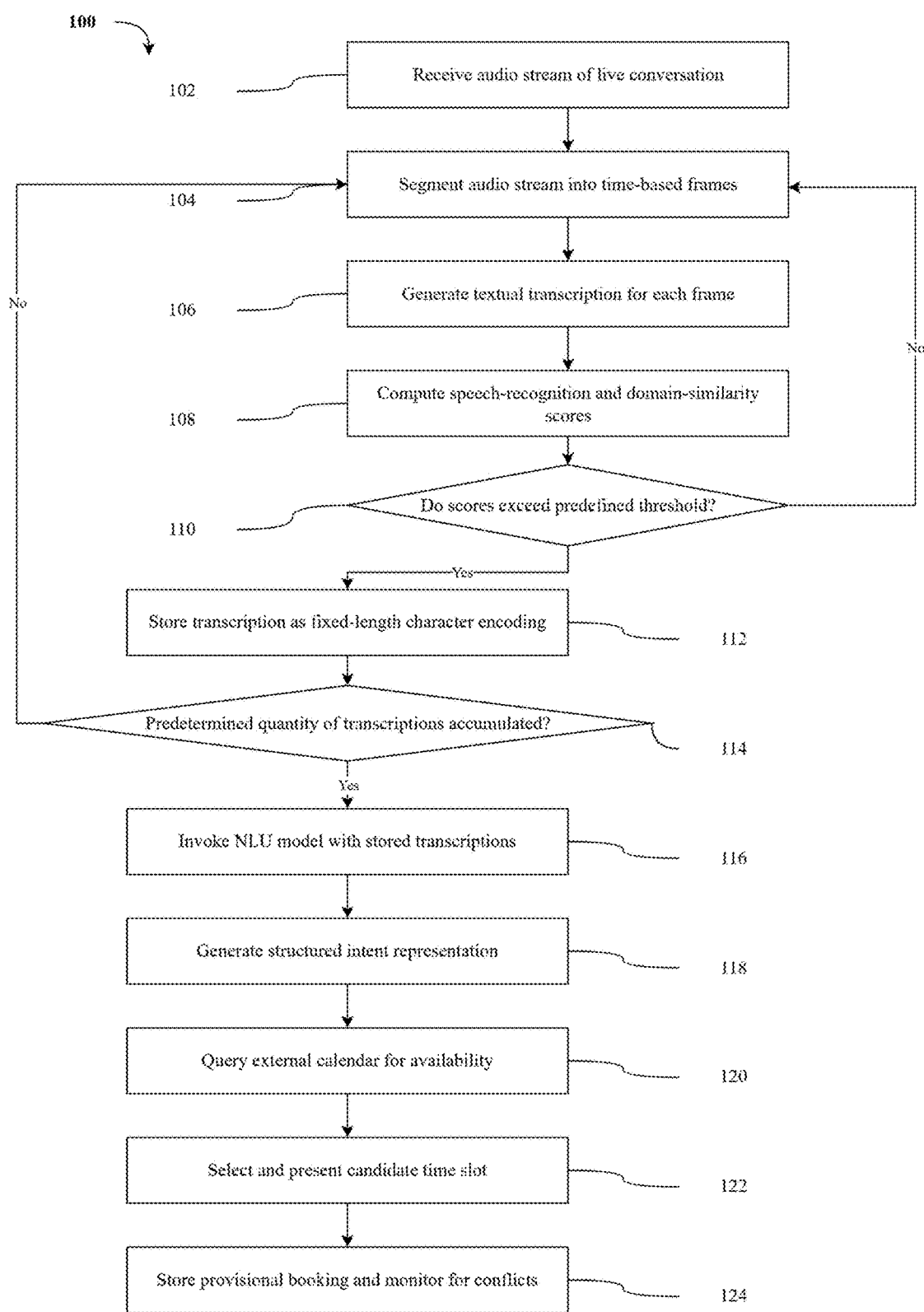

100

102 — Receive audio stream of live conversation

104 — Segment audio stream into time-based frames

106 — Generate textual transcription for each frame

108 — Compute speech-recognition and domain-similarity scores

110 — Do scores exceed predefined threshold?

No

No

Yes

Store transcription as fixed-length character encoding — 112

Predetermined quantity of transcriptions accumulated? — 114

Yes

Invoke NLU model with stored transcriptions — 116

Generate structured intent representation — 118

Query external calendar for availability — 120

Select and present candidate time slot — 122

Store provisional booking and monitor for conflicts — 124

FIG. 1

Appointment Scheduling Workflow
400

User Input Processor
402

Audio Stream Receiver
404

Transcription Generator
406

Intent Analysis Engine
408

NLU Model
410

Time Constraint Extractor
412

Availability Manager
414

Calendar Query Engine
416

Time Slot Selector
418

Booking Confirmation Handler
420

Provisional Booking Storage
422

Conflict Monitor
424

MEMORY MANAGEMENT SYSTEM FOR APPOINTMENT SCHEDULING

FIELD OF INVENTION

The present disclosure relates to appointment scheduling systems, and more particularly to a memory management system for appointment scheduling for automated booking.

BACKGROUND

Traditional appointment scheduling methods often present significant challenges in coordinating real-time availability between businesses and clients. This can lead to inefficiencies, missed opportunities, and increased friction in the booking process.

Current solutions typically rely on manual calendar management or static scheduling systems that require users to navigate predefined time slots. While these approaches provide basic functionality, they lack the ability to dynamically engage in real-time scheduling discussions or adapt to conversational nuances.

Existing systems face limitations in their capacity to interpret scheduling intent during live interactions, synchronize with up-to-date calendar availability with a plurality of AI agents operating simultaneously. Existing systems fail to manage plurality of AI agents accessing one memory and a shared calendar causing double bookings leading to storage and computational inefficiency.

SUMMARY

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

According to an aspect of the present disclosure, a computer-implemented method for managing memory allocation for appointment scheduling may be provided. The method may include receiving an audio stream corresponding to a live conversation and segmenting the audio stream into a sequence of time-based audio frames. For each audio frame, a textual transcription may be generated and at least one of a speech-recognition confidence score associated with the transcription or a domain-similarity score that quantifies semantic similarity between the transcription and a stored vocabulary using a cosine-distance function may be computed.

The method may store in working memory only transcriptions for which at least one of the speech-recognition confidence score or the domain-similarity score exceeds a predefined threshold. The stored transcriptions may be represented as fixed-length character encodings. Upon accumulation of a predetermined quantity of stored transcriptions in memory, a natural-language-understanding (NLU) model may be invoked and the stored transcriptions may be supplied as input. The NLU model may be executed to generate a structured intent representation that includes an appointment-booking intent and at least one time-related constraint.

The method may query an external calendar service for availability data based on the time-related constraint. A candidate time slot that satisfies the time-related constraint and is indicated as available in the availability data may be selected. The candidate time slot may be presented to a remote user within the same live conversation. Upon receiving user confirmation, the candidate time slot may be stored in a memory location reserved for provisional booking. Calendar availability may be monitored during a predetermined verification interval. The provisional booking may be converted to a confirmed appointment if no conflict is detected during the interval. Otherwise, an alternative time slot may be presented to the remote user within the same session.

The method may discard low-relevance transcriptions prior to memory allocation and delay invocation of the NLU model until the predetermined quantity of relevant transcriptions is accumulated to reduce transient memory usage and processor cycles during live interaction.

According to other aspects of the present disclosure, the method may include concurrently handling a plurality of live conversations on separate execution threads. To prevent overlapping bookings, a lock-free ring buffer may be maintained in cache-aligned shared memory. The ring buffer entries may each store a time-slot identifier and a status flag. Each thread may write a tentative booking record into the ring buffer using an atomic fetch-and-add operation. The status flag of the record may be promoted to confirmed state via an atomic compare-and-swap operation only when no other confirmed record in the ring buffer has the same time-slot identifier.

The ring buffer may be dimensioned to occupy a single processor cache line, allowing all status-flag updates to complete without a cache-miss penalty. The predefined threshold for the speech-recognition confidence score may be dynamically adjusted based on instantaneous processor-core utilization. The stored vocabulary of appointment-related terms may be compressed using a locality-sensitive-hashing structure to accelerate cosine-distance computation.

The NLU model may comprise a transformer-based sequence-to-sequence neural network distilled to a parameter footprint of less than 100 MB for edge deployment. Calendar availability data may be pre-fetched in the background while the NLU model executes. The time-related constraint may include a hard upper limit on start time and a minimum service duration. The method may further include generating a natural-language explanation of the confirmed appointment and transmitting the explanation as synthesized speech to the remote user.

According to another aspect of the present disclosure, a system for managing memory allocation for appointment scheduling may be provided. The system may include at least one multi-core processor, a memory coupled to the processor, an audio interface configured to capture a live audio stream, and a non-transitory computer-readable medium storing instructions that, when executed by the processor, cause the system to perform the method described above.

The system may include a cache-aligned lock-free ring buffer configured as described. The computer-readable medium may further store a transformer-based NLU model having fewer than 50 million trainable parameters. The audio interface may comprise a digital signal processor that performs the segmentation of the audio stream into time-based frames in hardware. The system may include a network interface that maintains persistent secure sockets to at least one external calendar service. The processor may support hardware-accelerated atomic fetch-and-add and compare-and-swap instructions used to implement the lock-free ring buffer.

The foregoing general description of the illustrative embodiments and the following detailed description thereof are merely exemplary aspects of the teachings of this disclosure and are not restrictive.

BRIEF DESCRIPTION OF FIGURES

Non-limiting and non-exhaustive examples are described with reference to the following figures.

FIG. 1 illustrates a flowchart for improving processing efficiency in real-time speech-based appointment scheduling, according to aspects of the present disclosure.

DETAILED DESCRIPTION

Figure 2:
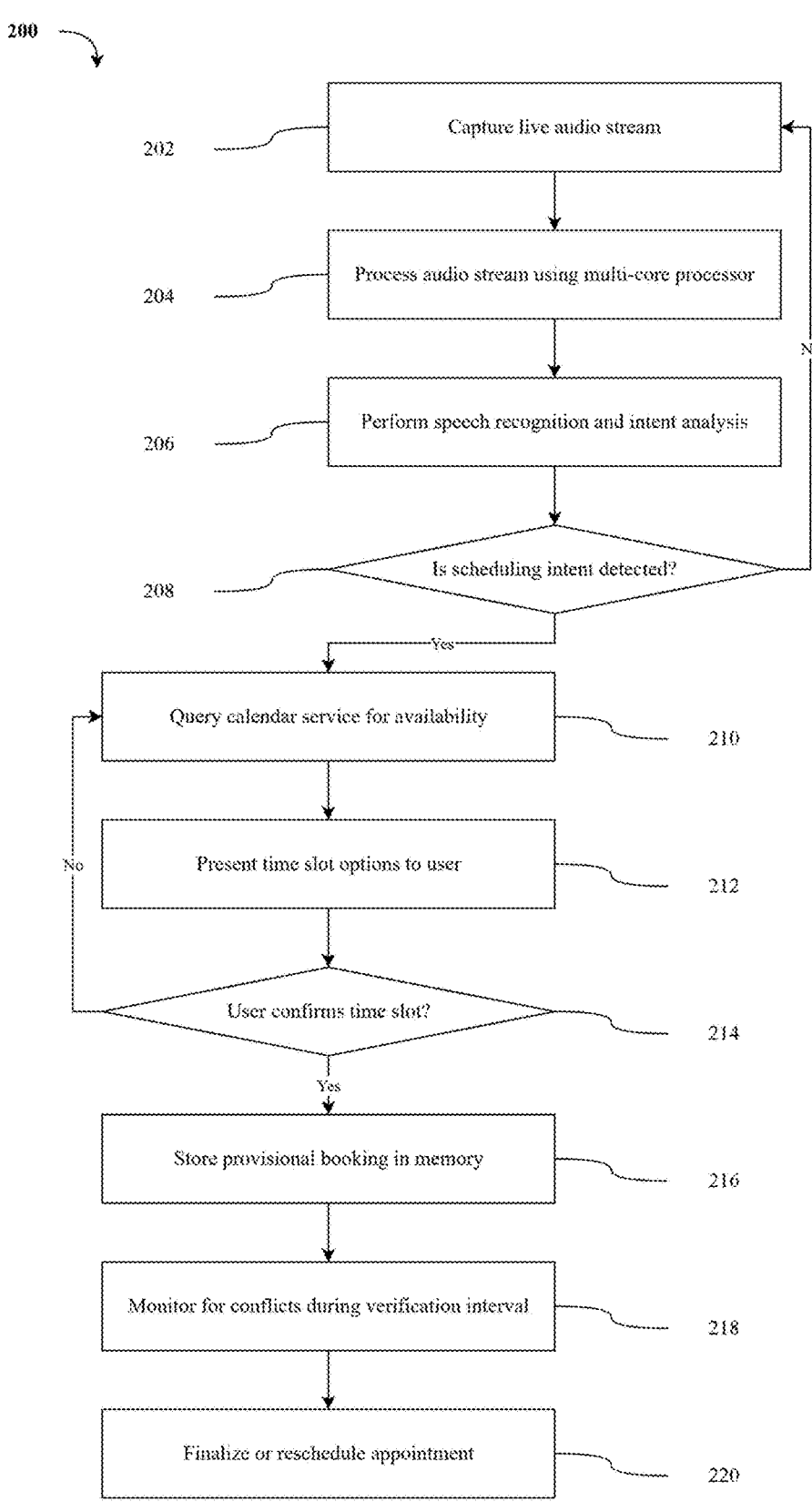
FIG. 2 depicts a flowchart for a computing system's appointment scheduling process, in accordance with example embodiments.

The present disclosure provides a system for AI-driven conversational appointment scheduling, comprising: a natural language processing module configured to interpret user inputs related to appointment scheduling; a calendar integration module configured to access real-time availability data from one or more external calendars; an AI agent configured to engage in scheduling-related conversations with users and suggest available appointment slots based on the interpreted user inputs and the real-time availability data; and a scheduling module configured to book appointments based on user confirmations and implement a delay period before finalizing bookings to account for potential conflicts. The system enables seamless appointment scheduling through natural language interactions, real-time calendar synchronization, and conflict prevention mechanisms.

The AI-driven conversational appointment scheduling system facilitates automated appointment booking through natural language interactions. This system integrates with existing calendar platforms to manage real-time availability. The system utilizes artificial intelligence to interpret user intent, negotiate scheduling options, and handle various scheduling scenarios without manual intervention.

The system initiates scheduling proactively based on predefined conversation flows or responds to user-initiated scheduling requests. The system accesses live calendar data to ensure up-to-date availability information during the scheduling process. The system employs a delay mechanism before finalizing bookings to account for potential last-minute changes or conflicts.

The system handles rescheduling and cancellation requests within the same conversation. The system supports multiple calendars and routes appointments to appropriate calendars based on contextual information. The system incorporates conflict resolution mechanisms to handle edge cases and maintain scheduling accuracy.

The AI-driven conversational appointment scheduling system comprises at least one processor and a memory storing instructions. The system is implemented as a non-transitory computer-readable medium storing instructions. The system supports scalability for multiple industries, including healthcare, automotive, home services, and more.

By automating the appointment scheduling process through conversational AI, the system reduces manual effort, minimizes scheduling conflicts, and enhances the overall efficiency of appointment management across various industries and use cases.

The method for improving processing efficiency in real-time speech-based appointment scheduling begins with receiving an audio stream corresponding to a live conversation involving appointment scheduling. The audio stream may be segmented into a sequence of time-based audio frames. For each audio frame, a textual transcription may be generated. Additionally, a speech-recognition confidence score associated with the transcription and a domain-similarity score may be computed. The domain-similarity score may quantify semantic similarity between the transcription and a stored vocabulary of appointment-related terms using a cosine-distance function.

In some cases, only transcriptions for which at least one of the speech-recognition confidence score or the domain-similarity score exceeds a predefined threshold may be stored. The stored transcriptions may be represented as fixed-length character encodings. The predefined threshold for the speech-recognition confidence score may be dynamically adjusted based on instantaneous processor-core utilization.

Upon accumulation of a predetermined quantity of stored transcriptions in memory, a natural-language-understanding (NLU) model may be invoked. The NLU model may comprise a transformer-based sequence-to-sequence neural network distilled to a parameter footprint of less than 100 MB for edge deployment. The stored transcriptions may be supplied as input to the NLU model.

The NLU model may be executed to generate a structured intent representation that includes an appointment-booking intent and at least one time-related constraint. In some cases, an external calendar service may be queried for availability data based on the time-related constraint. A candidate time slot that satisfies the time-related constraint and is indicated as available in the availability data may be selected.

The candidate time slot may be presented to a remote user within the same live conversation. Upon receiving user confirmation, the candidate time slot may be stored in a memory location reserved for provisional booking. Calendar availability may be monitored during a predetermined verification interval. The provisional booking may be converted to a confirmed appointment if no conflict is detected during the interval. Otherwise, an alternative time slot may be presented to the remote user within the same session.

In some cases, the stored vocabulary of appointment-related terms may be compressed using a locality-sensitive-hashing structure to accelerate cosine-distance computation. This compression may improve processing efficiency by reducing the computational resources required for similarity calculations.

By discarding low-relevance transcriptions prior to memory allocation and delaying invocation of the NLU model until the predetermined quantity of relevant transcriptions is accumulated, the method may reduce transient memory usage and processor cycles during live interaction. This approach may contribute to improved processing efficiency in real-time speech-based appointment scheduling.

The AI-driven conversational appointment scheduling system incorporates advanced mechanisms to prevent double booking while maintaining minimal latency through its lock-free ring buffer architecture and real-time synchronization protocols. The system addresses the common challenge of booking latency by implementing atomic operations that ensure immediate availability updates without requiring traditional locking mechanisms that can introduce delays.

The lock-free ring buffer operates using hardware-accelerated atomic fetch-and-add and compare-and-swap instructions, enabling multiple concurrent booking attempts to be processed simultaneously without blocking operations. When a provisional booking is created, the system immediately writes a tentative record to the ring buffer using an atomic operation, effectively reserving the time slot instantaneously. This approach eliminates the typical delay period where a cancelled or expired booking remains unavailable to other users while database transactions complete or cache invalidation propagates across distributed systems.

The system's real-time availability propagation mechanism ensures that when a booking is cancelled or expires, the corresponding time slot becomes immediately available for new bookings. The atomic compare-and-swap operation used to promote tentative bookings to confirmed status operates at the processor level, bypassing traditional database locking mechanisms that can introduce significant latency. This hardware-level synchronization allows the system to maintain consistency across concurrent operations while providing instantaneous feedback to users about slot availability.

The cache-aligned design of the ring buffer further enhances performance by ensuring that all status updates occur within a single processor cache line, eliminating cache-miss penalties that could introduce microsecond-level delays. This optimization is particularly important in high-throughput scenarios where multiple users may be attempting to book the same or adjacent time slots simultaneously. The system's ability to process these operations without cache misses ensures that availability updates propagate immediately across all active sessions.

To complement the lock-free architecture, the system employs background availability monitoring that continuously validates the consistency between the ring buffer state and external calendar services. This monitoring process operates independently of user-facing operations, ensuring that any discrepancies between the system's internal state and external calendar data are resolved without impacting the immediate responsiveness of the booking interface. The combination of atomic operations, cache optimization, and background validation creates a booking system that maintains both consistency and minimal latency under high concurrent load conditions.

FIG. 2 illustrates a flowchart for a computing system's appointment scheduling process. The process begins with a step 200, where the system captures a live audio stream. In a step 202, the system processes the audio stream using a multi-core processor. The process then moves to a step 204, where the system performs speech recognition and intent analysis.

Following the analysis, the process reaches a decision point 206 to determine if a scheduling intent is detected. If no scheduling intent is detected, the process returns to step 200 to capture another live audio stream. If a scheduling intent is detected, the process proceeds to a step 208, where the system queries a calendar service for availability.

In some cases, the system may pre-fetch calendar availability data in the background while the natural language understanding (NLU) model executes. This pre-fetching may improve processing efficiency by reducing latency in retrieving availability information.

The process then moves to a step 210, where time slot options are presented to the user. The system may select a candidate time slot that satisfies time-related constraints and is indicated as available in the availability data. These time-related constraints may include a hard upper limit on start time and a minimum service duration.

This leads to another decision point 212, where the system checks if the user confirms a time slot. If the user does not confirm, the process returns to step 208 to query the calendar service again. If the user confirms, the process advances to a step 214, where a provisional booking is stored in memory.

The flowchart continues with a step 216, where the system monitors for conflicts during a verification interval. This monitoring may involve checking calendar availability during a predetermined verification interval to ensure the selected time slot remains available.

Finally, the process concludes with a step 218, where the appointment is finalized or rescheduled. If no conflict is detected during the verification interval, the system may convert the provisional booking to a confirmed appointment. Otherwise, the system may present an alternative time slot to the user within the same session.

In some cases, the system may generate a natural-language explanation of the confirmed appointment and transmit the explanation as synthesized speech to the remote user. This feature may enhance user understanding and confirmation of the scheduled appointment.

The flowchart depicts a sequential process for appointment scheduling, incorporating speech recognition, intent analysis, and user interaction. The process includes decision points that allow for iterative refinement of scheduling options and conflict monitoring to ensure accurate appointment booking.

Figure 3:
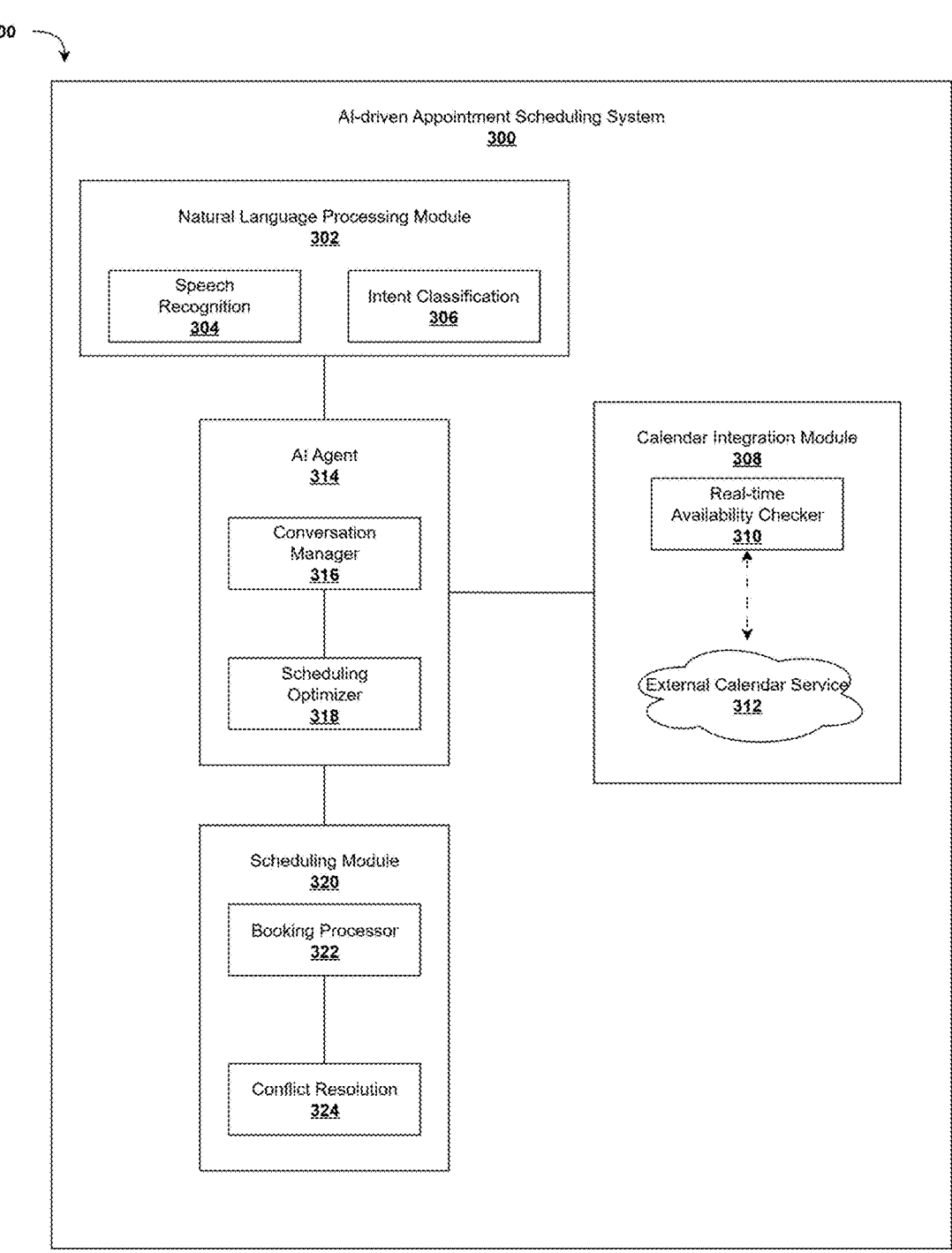
FIG. 3 shows a system diagram of an AI-driven Appointment Scheduling System, according to an embodiment.

The AI-driven Appointment Scheduling System 300 may comprise several interconnected modules that work together to process natural language inputs, manage calendars, and schedule appointments. FIG. 3 illustrates a system diagram of the AI-driven Appointment Scheduling System 300.

A Natural Language Processing Module 302 may be included in the AI-driven Appointment Scheduling System 300. The Natural Language Processing Module 302 may comprise a Speech Recognition component 304 and an Intent Classification component 306. The Speech Recognition component 304 may be configured to process audio inputs and convert them into text. The Intent Classification component 306 may analyze the converted text to determine the user's intent regarding appointment scheduling.

In some cases, the AI-driven Appointment Scheduling System 300 may include an audio interface configured to capture a live audio stream. This audio interface may comprise a digital signal processor that performs the segmentation of the audio stream into time-based frames in hardware.

A Calendar Integration Module 308 may be part of the AI-driven Appointment Scheduling System 300. The Calendar Integration Module 308 may include a Real-time Availability Checker 310 that interacts with an External Calendar Service 312. The Real-time Availability Checker 310 may query the External Calendar Service 312 to retrieve up-to-date availability information for scheduling appointments.

In some cases, the AI-driven Appointment Scheduling System 300 may further comprise a network interface that maintains persistent secure sockets to at least one External Calendar Service 312.

An AI Agent 314 may serve as a central component of the AI-driven Appointment Scheduling System 300. The AI Agent 314 may be connected to both the Natural Language Processing Module 302 and the Calendar Integration Module 308. The AI Agent 314 may contain a Conversation Manager 316 and a Scheduling Optimizer 318. The Conversation Manager 316 may handle user interactions, while the Scheduling Optimizer 318 may work to find optimal appointment times based on user preferences and calendar availability.

A Scheduling Module 320 may be connected to the AI Agent 314 in the AI-driven Appointment Scheduling System 300. The Scheduling Module 320 may consist of a Booking Processor 322 and a Conflict Resolution component 324. The Booking Processor 322 may handle the actual scheduling of appointments, while the Conflict Resolution component 324 may work to resolve any conflicts that arise during the scheduling process.

The AI-driven Appointment Scheduling System 300 may comprise at least one multi-core processor. In some cases, the processor may support hardware-accelerated atomic fetch-and-add and compare-and-swap instructions used to implement a lock-free ring buffer.

The AI-driven Appointment Scheduling System 300 may include a memory coupled to the processor. In some cases, the memory may include a cache-aligned lock-free ring buffer.

A non-transitory computer-readable medium may be included in the AI-driven Appointment Scheduling System 300. This computer-readable medium may store instructions to perform various appointment scheduling methods. In some cases, the computer-readable medium may store a transformer-based NLU model having fewer than 50 million trainable parameters.

The AI-driven Appointment Scheduling System 300 may operate by processing natural language inputs through the Natural Language Processing Module 302, which then communicates with the AI Agent 314. The AI Agent 314 may utilize information from the Calendar Integration Module 308 to check availability and optimize scheduling. The Scheduling Module 320 may then process the booking and resolve any conflicts.

Figure 4:
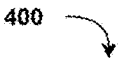
FIG. 4 illustrates a system diagram of an appointment scheduling workflow, according to aspects of the present disclosure.

FIG. 4 illustrates an appointment scheduling workflow 400. The appointment scheduling workflow 400 may comprise several interconnected components that work together to process user inputs, analyze intent, manage availability, and handle booking confirmations.

A user input processor 402 may be included in the appointment scheduling workflow 400. The user input processor 402 may comprise an audio stream receiver 404 and a transcription generator 406. The audio stream receiver 404 may be configured to capture live audio streams corresponding to conversations involving appointment scheduling. The transcription generator 406 may convert the captured audio streams into textual transcriptions for further processing.

An intent analysis engine 408 may be part of the appointment scheduling workflow 400. The intent analysis engine 408 may include an NLU model 410 and a time constraint extractor 412. The NLU model 410 may analyze the textual transcriptions to determine the user's intent regarding appointment scheduling. The time constraint extractor 412 may identify specific time-related information from the analyzed transcriptions.

An availability manager 414 may be included in the appointment scheduling workflow 400. The availability manager 414 may comprise a calendar query engine 416 and a time slot selector 418. The calendar query engine 416 may interact with external calendar services to retrieve up-to-date availability information. The time slot selector 418 may use the retrieved availability data and identified time constraints to select suitable appointment slots.

A booking confirmation handler 420 may be part of the appointment scheduling workflow 400. The booking confirmation handler 420 may include a provisional booking storage 422 and a conflict monitor 424. The provisional booking storage 422 may temporarily store booking information before final confirmation. The conflict monitor 424 may check for potential scheduling conflicts during a verification interval.

The Scheduling Module may concurrently handle a plurality of live conversations on separate execution threads. The Booking Processor may maintain a lock-free ring buffer in cache-aligned shared memory to prevent overlapping bookings. The lock-free ring buffer entries may each store a time-slot identifier and a status flag.

The Booking Processor may write a tentative booking record into the lock-free ring buffer using an atomic fetch-and-add operation. The Booking Processor may promote the status flag of the record to confirmed state via an atomic compare-and-swap operation only when no other confirmed record in the lock-free ring buffer has the same time-slot identifier.

The lock-free ring buffer is dimensioned to occupy a single processor cache line. This configuration allows for efficient memory access and reduce potential conflicts during concurrent operations.

The booking confirmation handler 420 may implement a 30-second delay before finalizing bookings to account for real-time updates and potential user changes. During this delay period, the conflict monitor 424 may continuously check for any changes in availability or user preferences.

The AI Agent may handle rescheduling and cancellation requests during the same call. If a user requests to reschedule or cancel an appointment, the intent analysis engine 408 may detect this intent, and the availability manager 414 may process the request accordingly.

The appointment scheduling workflow 400 may operate by processing user inputs through the user input processor 402, analyzing intent via the intent analysis engine 408, managing availability through the availability manager 414, and handling booking confirmations with the booking confirmation handler 420. This workflow may allow for efficient processing of appointment requests, analysis of user intentions, checking of calendar availability, and confirmation of bookings while minimizing conflicts and ensuring real-time accuracy.

The AI-driven conversational appointment scheduling system comprises several interconnected components that work together to facilitate automated appointment booking through natural language interactions. The system architecture includes a Main Controller, Activity Monitor, Transcriber, AI Data Manager, AI Interactor Base, Loader, and Dashboard/Call Interface.

The Main Controller serves as the central coordination unit for the system. The Main Controller oversees system processes and manages the flow of information between various modules. The Main Controller initiates scheduling workflows, handles error detection and recovery processes, and ensures overall system reliability.

The Activity Monitor detects conversational pauses and determines appropriate moments for scheduling initiation. The Activity Monitor analyzes the rhythm and flow of the conversation to identify suitable opportunities for the AI agent to introduce or continue the scheduling process without interrupting the natural dialogue.

The Transcriber captures user speech and converts it into structured text for processing. The Transcriber employs speech recognition technologies to accurately transcribe spoken language into a format that can be analyzed by other system components. The Transcriber also handles text-based inputs for consistency across different communication channels.

The AI Data Manager handles scheduling logic and parses date and time preferences from user conversations. The AI Data Manager utilizes natural language processing techniques to extract relevant scheduling information from the transcribed text. The AI Data Manager maintains contextual awareness throughout the conversation to ensure accurate interpretation of user intentions and preferences.

The AI Interactor Base determines the most suitable available appointment slots based on real-time data. The AI Interactor Base interfaces with the calendar integration system to access up-to-date availability information and applies scheduling algorithms to identify optimal time slots for appointments.

The Loader retrieves calendar availability and timezone settings. The Loader handles the synchronization of calendar data from external sources, ensuring that the system has access to accurate and current scheduling information. The Loader manages the periodic polling of calendar data to maintain real-time accuracy.

The Dashboard/Call Interface provides a user interface for calendar connection, scheduling state configuration, and booking visibility. The Dashboard/Call Interface allows system administrators or users to manage calendar integrations, define scheduling rules, and monitor appointment bookings.

These components interact in a coordinated manner to facilitate the appointment scheduling process. The Transcriber captures and converts user speech into text. The AI Data Manager analyzes this transcribed text to identify scheduling-related intents and extract relevant information. The Activity Monitor determines an appropriate moment to initiate or continue the scheduling process without disrupting the conversation. The Main Controller coordinates information flow between modules, triggering the AI Interactor Base to suggest available time slots. The Loader retrieves up-to-date calendar data to ensure accurate availability information. Based on the analyzed data and real-time availability, the AI Interactor Base proposes suitable appointment slots. The Main Controller manages the confirmation process, including implementing any delay mechanisms for conflict resolution. Finally, the Dashboard/Call Interface displays the confirmed appointment details and updates the system's scheduling state, completing the booking process.

The AI-driven conversational appointment scheduling system incorporates advanced natural language processing techniques for speech detection and intent recognition. The system receives an audio stream of a live conversation directed to appointment scheduling. This audio stream undergoes segmentation into successive audio frames, allowing for real-time analysis of the conversation as it unfolds.

For each audio frame, the system produces a textual hypothesis through speech recognition algorithms. The system then assigns two scores to each textual hypothesis: a speech-recognition confidence score and a domain-relevance score. The speech-recognition confidence score represents the system's certainty in the accuracy of the speech-to-text conversion. The domain-relevance score quantifies the semantic similarity between the textual hypothesis and a predetermined appointment-booking vocabulary.

The system calculates the domain-relevance score using a semantic similarity measure. This measure computes the degree of semantic relatedness between the textual hypothesis and the appointment-booking vocabulary. The semantic similarity calculation utilizes techniques such as cosine similarity between word embeddings or Jaccard similarity of n-grams.

Based on these scores, the system discards audio frames that fall below specified thresholds. Audio frames with low speech-recognition confidence scores or low domain-relevance scores are filtered out. This filtering process helps reduce noise and irrelevant information in the processed data, focusing on the most pertinent parts of the conversation for appointment scheduling.

The system accumulates the filtered textual hypotheses until a predetermined token budget is met. Once this budget is satisfied, the system invokes a natural-language-understanding model. This model comprises a transformer-based architecture, which enables efficient processing of sequential data and captures complex dependencies in natural language.

The natural-language-understanding model executes on the accumulated textual input to generate structured intent data. This structured data specifies appointment-booking intents and temporal constraints expressed by the user. The model extracts relevant scheduling information such as desired appointment types, preferred dates and times, and any specific requirements mentioned during the conversation.

The AI-driven system employs an AI date Language Learning Model (LLM) that continuously monitors the calls for rescheduling and canceling requests. This LLM analyzes the conversation in real-time, identifying user intents related to modifying existing appointments or canceling scheduled meetings.

To maintain context awareness throughout the conversation, the system saves every interaction. Each time a new user transcription comes through, the system sends the last four conversations between the user and the AI agent as context. This approach allows the natural-language-understanding model to consider recent conversation history when interpreting user intents and generating responses.

The transformer-based architecture of the natural-language-understanding model enables it to process long-range dependencies in the conversation effectively. This capability allows the model to maintain coherence across multi-turn interactions, capturing nuanced scheduling requests that may span multiple user utterances.

The natural-language-understanding model undergoes training on a diverse dataset of scheduling-related conversations. This training data includes various appointment types, rescheduling scenarios, and cancellation requests. The model learns to recognize different phrasings and expressions related to appointment scheduling, enhancing its ability to accurately interpret user intents across a wide range of conversational styles.

By leveraging these advanced natural language processing and intent recognition techniques, the AI-driven conversational appointment scheduling system accurately interprets user inputs and extracts scheduling-related information from conversations. This enables the system to facilitate seamless and efficient appointment booking interactions while maintaining context awareness and adapting to various user communication styles.

The AI-driven conversational appointment scheduling system incorporates real-time calendar integration to ensure accurate and up-to-date availability information during the scheduling process. This integration allows the system to access and synchronize with external calendar services, enabling seamless appointment booking and conflict resolution.

The system utilizes API integration to connect with external calendar services. This integration facilitates the retrieval of availability data from the external calendar service, which comprises multiple calendars for different departments or individuals within an organization. The system employs multiple methods to maintain current availability data.

One method involves polling the external calendar service at predetermined intervals. These polling intervals are set to approximately 50 seconds, allowing the system to pull the latest calendar data on a regular basis. This frequent polling helps ensure that the availability information used for scheduling remains current and accurate.

The system also utilizes webhook notifications to receive immediate updates about calendar changes. Webhook listeners are configured to detect modifications in the user's calendar, such as manual updates or new appointments added through other interfaces. Upon receiving a webhook notification, the system updates its internal availability model in real-time, preventing potential conflicts or double-bookings.

When dealing with multiple calendars, the calendar integration module incorporates logic to determine the appropriate calendar for scheduling a specific appointment. This determination is based on factors such as the nature of the appointment, the department or individual requested, or other contextual information provided during the scheduling process.

The calendar integration module handles scenarios where availability needs to be checked across multiple calendars. This involves aggregating free time slots from various calendars to offer a range of options to the user. The module then manages the process of reserving the chosen time slot on the appropriate calendar once a selection is made.

By employing these various methods and functionalities, the real-time calendar integration provides a robust foundation for maintaining accurate and up-to-date availability information. This enables the AI-driven appointment scheduling system to offer reliable and efficient scheduling services across a wide range of use cases and organizational structures.

The AI-driven conversational appointment scheduling system facilitates a comprehensive process for scheduling appointments in real-time. This process encompasses multiple steps, from initial user interaction to final appointment confirmation, incorporating advanced mechanisms for conflict resolution and ensuring accurate scheduling.

The scheduling process begins when a user initiates contact through a supported communication channel. The system analyzes the user's input to extract relevant information and identify the scheduling intent. Once the intent is recognized, the system engages in a dialogue to gather necessary details, such as preferred dates and times for the appointment.

Upon collecting user preferences, the system accesses real-time calendar data to retrieve up-to-date availability information. The system then applies scheduling algorithms to select candidate time slots based on the user's constraints and current availability. These algorithms consider factors such as the duration of the appointment, any specific requirements expressed by the user, and the overall scheduling efficiency.

After identifying suitable options, the system presents one or more candidate time slots to the remote user. The presentation of these options occurs within the same live conversation, maintaining a seamless and interactive scheduling experience. The system may offer specific time slots, such as "Tuesday at 2:00 PM" or "Thursday at 11:00 AM," depending on the nature of the appointment and available openings.

When the user selects a preferred time slot, the system initiates a provisional booking process. This provisional booking is stored in a lock-free shared-memory ring buffer. The use of a lock-free structure allows for efficient concurrent access and updates, minimizing contention between multiple scheduling threads and improving overall system performance.

Following the creation of the provisional booking, the system implements a predetermined verification interval of 30 seconds. During this interval, the system actively monitors calendar availability to detect any potential conflicts or last-minute changes that may affect the selected time slot.

The 30-second verification interval serves multiple purposes. First, it allows the system to account for near-simultaneous booking attempts that may occur in high-traffic scenarios. Second, it provides a buffer for real-time updates to propagate across the system, ensuring that the most current availability information is considered before finalizing the appointment.

Throughout the verification interval, the system continues to process incoming calendar updates and booking requests. If a conflict arises during this period, such as another user securing the same time slot through a different channel, the system detects this change and prepares to offer alternative options to the current user.

If no conflicts are detected during the 30-second verification interval, the system proceeds to convert the provisional booking into a confirmed appointment. This conversion involves updating the relevant calendars, generating a unique booking identifier, and preparing confirmation details for the user.

In cases where a conflict is detected during the verification interval, the system immediately initiates a conflict resolution procedure. This procedure involves identifying alternative time slots that closely match the user's original preferences. The system then presents these alternative options to the remote user, allowing them to select a new time slot without restarting the entire scheduling process.

The conflict resolution mechanism ensures that users are promptly informed of any availability changes and are provided with suitable alternatives. This approach minimizes scheduling conflicts and enhances the overall user experience by maintaining a smooth and efficient booking process even in dynamic scheduling environments.

Once a conflict-free time slot is secured, either through the initial selection or the conflict resolution process, the system finalizes the appointment booking. This finalization includes updating all relevant calendar systems, generating a confirmation message for the user, and triggering any necessary notifications or follow-up actions.

The appointment scheduling process incorporates continuous monitoring and real-time updates to maintain accuracy and prevent conflicts. By leveraging advanced algorithms, lock-free data structures, and a carefully designed verification interval, the system ensures efficient and reliable appointment scheduling across various scenarios and user interactions.

The AI-driven conversational appointment scheduling system incorporates robust capabilities for handling appointment changes, including rescheduling and cancellations. These features allow users to modify or cancel their appointments seamlessly within the same conversation, enhancing flexibility and user convenience.

The system detects rescheduling or cancellation requests through natural language processing of user inputs. When such a request is identified, the AI agent initiates the appropriate workflow to accommodate the user's needs.

For rescheduling scenarios, the system first retrieves the existing appointment details associated with the user. This retrieval process utilizes a unique booking identifier linked to the user's contact information, such as phone number or email address. Once the current appointment is identified, the system guides the user through the rescheduling process.

The rescheduling workflow involves several sequential steps to ensure accurate appointment modification. The system begins by confirming the user's intent to reschedule, followed by identifying preferred new date and time options from the user's input. The system then checks real-time availability for the requested slots through its calendar integration module. If the requested times are unavailable, the system proposes alternative times based on current calendar openings. Once a suitable time is identified, the system confirms the new appointment details with the user before updating the calendar to reflect the changes.

In the case of cancellations, the system employs a similar process to verify the user's intent and identify the correct appointment to cancel. The cancellation workflow includes several important steps for proper appointment removal. The system starts by confirming the user's intent to cancel, then proceeds to identify the specific appointment in question. The system verifies the cancellation details with the user to ensure accuracy before updating the calendar to remove the cancelled appointment. Finally, the system provides confirmation of the cancellation to the user to complete the process.

The system handles these rescheduling and cancellation requests within the same conversation, eliminating the need for separate workflows or additional user interactions. This streamlined approach enhances user experience and reduces the likelihood of errors or miscommunications in appointment management.

To facilitate efficient rescheduling and cancellation processes, the system maintains a unique booking identifier associated with each appointment. This identifier is linked to the user's contact information, allowing for quick and accurate retrieval of appointment details when modifications are requested.

The system's natural language understanding component is specifically trained to recognize and interpret rescheduling and cancellation intents within user utterances. This capability enables the system to seamlessly transition from general conversation to appointment modification workflows when necessary.

When processing rescheduling requests, the system's AI agent dynamically adjusts its conversational flow to gather the necessary information for the new appointment time. This adaptive approach ensures that the system collects all required details while maintaining a natural and user-friendly interaction.

The system's calendar integration module plays a crucial role in the rescheduling process by providing real-time availability information. This integration ensures that the system offers only valid and up-to-date time slots when suggesting alternative appointment times during rescheduling.

For cancellation requests, the system implements a confirmation step to prevent accidental appointment removals. This additional verification helps maintain the integrity of the scheduling system and reduces the likelihood of unintended cancellations.

After processing a rescheduling or cancellation request, the system automatically updates all relevant records and integrated systems. This includes modifying calendar entries, updating customer relationship management (CRM) records, and triggering any necessary notifications or follow-up actions.

The system's ability to handle rescheduling and cancellation requests within the same conversation extends to various communication channels, including voice calls, text messages, and web-based interfaces. This multi-channel support ensures consistent functionality across different user interaction methods.

To enhance the user experience during rescheduling, the system retains context from the original appointment booking. This contextual awareness allows the system to offer more personalized and relevant suggestions when proposing new appointment times.

The system's rescheduling and cancellation capabilities are designed to handle complex scenarios, such as recurring appointments or appointments involving multiple participants. In these cases, the AI agent provides additional options or requests clarification to ensure the appropriate changes are made.

By incorporating these comprehensive rescheduling and cancellation features, the AI-driven conversational appointment scheduling system offers users greater flexibility in managing their appointments. This functionality helps reduce no-shows, improves resource allocation, and enhances overall user satisfaction with the scheduling process.

The AI-driven conversational appointment scheduling system incorporates multi-calendar and multi-agent support to accommodate complex organizational structures and diverse scheduling needs. This capability allows businesses to manage appointments across different departments, team members, or specialized services within a single integrated system.

The system supports the connection and management of multiple calendars, each associated with distinct departments, individuals, or purposes within an organization. For example, a software-as-a-service company utilizes separate calendars for product demonstrations, technical consultations, and account management meetings. Similarly, a marketing technology provider maintains different calendars for platform overviews, implementation planning, and customer success check-ins.

The system employs intelligent routing mechanisms to direct appointment bookings to the appropriate calendar based on various factors. The routing decision is influenced by the context of the conversation or the specific sequence logic defined within the AI agent's workflow. In a multi-department scenario, when a prospect requests to schedule a demonstration of an email marketing platform, the system helps schedule the demonstration by offering available times with the product specialist, such as Monday at 2:00 PM and Wednesday at 10:00 AM, automatically routing the booking to the product demonstration team's calendar based on the specific feature request.

The system handles complex routing scenarios that require additional context or user input. When a prospect expresses interest in booking an appointment to discuss enterprise data solutions, the system requests clarification on whether they're interested in meeting with a data analytics specialist for visualization features or a data integration expert for API connectivity options. Upon learning the prospect is interested in data visualization capabilities, the system checks availability of the analytics team and offers openings such as Tuesday at 11:00 AM and Thursday at 3:30 PM, using the additional context to route the appointment to the appropriate calendar.

The multi-calendar support extends to availability management across various calendars. The system is capable of cross-referencing availability across multiple calendars to find suitable appointment times for scenarios that require coordination between different departments or team members. In a software company setting, when a prospect wants to discuss implementation timelines and pricing options for an enterprise solution, the system schedules both a technical consultation and a meeting with the sales team by checking availability for both implementation specialists and account executives. The system identifies a slot on Friday at 2:00 PM for the technical discussion followed by a meeting with a pricing specialist at 3:00 PM, effectively coordinating availability across the technical and sales team calendars to propose a convenient schedule for the prospect.

The multi-agent support allows different AI agents to be configured for specific departments or services, each with tailored conversation flows and scheduling logic. These specialized agents are designed to handle domain-specific inquiries and scheduling requirements while maintaining a consistent user experience across the organization.

The system determines the appropriate calendar from multiple calendars based on structured intent data extracted from user interactions. The AI agent analyzes the conversation context, user preferences, and specific scheduling requirements to identify the most suitable calendar for each appointment. This process involves parsing the structured intent data, which includes information such as the type of service requested, the department or team involved, and any specific constraints or preferences expressed by the user.

For instance, when a user requests a product demonstration for a specific software module, the system extracts this intent from the conversation and matches it with the appropriate product specialist's calendar. If the user mentions a preference for discussing technical implementation details, the system routes the appointment to a calendar associated with the technical support team.

The system's multi-calendar functionality enables each AI agent to connect to multiple calendars, such as those for sales, support, and onboarding teams. The AI agent uses conversation context or predefined sequence logic to route bookings to the correct calendar. For example, if a qualified lead expresses interest in discussing pricing and contract terms, the system routes the appointment to an account manager's calendar. Conversely, if the conversation revolves around technical support or troubleshooting, the system directs the booking to a technical agent's calendar.

This intelligent routing mechanism ensures that appointments are scheduled with the most appropriate team or individual based on the specific needs and context of each interaction. By leveraging multi-calendar and multi-agent support, the AI-driven conversational appointment scheduling system provides businesses with a flexible and scalable solution for managing complex scheduling needs across various departments and services. This capability enhances operational efficiency and improves the overall user experience by ensuring that appointments are routed to the most appropriate resources within the organization.

The AI-driven conversational appointment scheduling system incorporates advanced machine learning and artificial intelligence techniques to enhance its capabilities across various components. The natural language processing module utilizes a transformer-based architecture, specifically BERT (Bidirectional Encoder Representations from Transformers), to understand and interpret user inputs related to scheduling requests.

The intent classification component employs a fine-tuned version of GPT (Generative Pre-trained Transformer), adapted specifically for scheduling-related tasks. This model is trained on a diverse dataset of scheduling conversations, including various appointment types, rescheduling scenarios, and cancellation requests. The training process involves transfer learning techniques, where the pre-trained model is further fine-tuned on domain-specific data to improve its performance in understanding scheduling intents.

The system utilizes a recurrent neural network (RNN) with long short-term memory (LSTM) units to maintain context awareness throughout multi-turn conversations. This architecture is trained on sequences of user-agent interactions, allowing the system to capture long-term dependencies and provide more coherent and context-aware responses during the scheduling process.

The AI agent responsible for suggesting available appointment slots incorporates a reinforcement learning approach using Deep Q-Networks (DQN). This agent is trained in a simulated environment that mimics real-world scheduling scenarios, with rewards based on successful appointment bookings, user satisfaction metrics, and efficient resource utilization. The training data includes historical scheduling patterns, user preferences, and calendar availability information.

For handling edge cases and conflict resolution, the system employs an ensemble learning approach, combining multiple models such as random forests, gradient boosting machines, and neural networks. These models are trained on a dataset of past scheduling conflicts, resolution strategies, and their outcomes. The ensemble method improves the robustness and accuracy of the system's decision-making process in complex scheduling scenarios.

The system's anomaly detection capabilities are enhanced through the use of unsupervised learning techniques, specifically autoencoders and isolation forests. These models are trained on normal scheduling patterns and behaviors, allowing them to identify unusual activities that deviate from the expected norms. The training data includes historical scheduling logs, user interaction patterns, and system performance metrics.

The system utilizes a graph neural network (GNN) to model and analyze the relationships between users, appointments, and resources. This approach enables more sophisticated conflict detection and resolution strategies by considering the interconnected nature of scheduling data. The GNN is trained on a graph-structured dataset representing historical scheduling information, including user connections, appointment dependencies, and resource allocations.

The AI-driven system incorporates a natural language generation (NLG) component based on sequence-to-sequence models with attention mechanisms, using the Transformer architecture. This component is responsible for generating human-like responses during scheduling interactions. The NLG model is trained on a parallel corpus of scheduling-related conversations, pairing user inputs with appropriate system responses.

To optimize resource allocation and improve scheduling efficiency, the system employs a multi-agent reinforcement learning approach. Each agent represents a different resource or calendar, and the agents are trained collectively to maximize overall scheduling efficiency while minimizing conflicts. The training environment simulates various scheduling scenarios, including high-demand periods and resource constraints.

The system's ability to adapt to changing user preferences and scheduling patterns is enhanced through the use of online learning algorithms, specifically Follow-the-Regularized-Leader (FTRL) and Online Gradient Descent. These algorithms allow the system to continuously update its models based on new interactions and feedback, ensuring that the scheduling suggestions remain relevant and personalized over time.

By incorporating these advanced machine learning and artificial intelligence techniques, the AI-driven conversational appointment scheduling system provides more accurate, efficient, and adaptable scheduling capabilities. These AI-powered features contribute to an enhanced user experience and improved operational efficiency in managing appointments across various scenarios and use cases.

The AI-driven conversational appointment scheduling system incorporates advanced machine learning models to enable natural language understanding, intent classification, and adaptive scheduling capabilities. The system utilizes transformer-based language models for natural language processing tasks. These models employ self-attention mechanisms to capture contextual relationships within user utterances, enabling accurate interpretation of scheduling-related requests. The transformer architecture processes long-range dependencies in conversations, which is particularly useful for maintaining context across multi-turn scheduling interactions.

For intent classification, the system combines convolutional neural networks (CNNs) and recurrent neural networks (RNNs). CNNs extract local features from user inputs, while RNNs, specifically long short-term memory (LSTM) networks, capture sequential dependencies in the conversation. This hybrid architecture accurately classifies user intents related to scheduling, rescheduling, or canceling appointments.

The system incorporates a hierarchical attention network (HAN) for contextual understanding and response generation. The HAN architecture attends to relevant parts of the conversation history when generating responses, ensuring that scheduling suggestions remain coherent and context-aware throughout the interaction.

The training process for these AI models involves several stages and techniques to enhance their performance and adaptability. The system employs transfer learning approaches, where pre-trained language models are fine-tuned on domain-specific scheduling datasets. This approach leverages general language understanding capabilities while adapting to specific scheduling scenarios and industry terminologies.

The training data for the AI models is curated from a diverse range of scheduling interactions across various domains. The training process involves data augmentation techniques to increase the diversity and volume of training examples. This includes paraphrasing, back-translation, and synthetic data generation to create additional training samples that capture different ways of expressing scheduling intents.

To improve the robustness of the AI models, the training process incorporates adversarial training techniques. This approach involves generating challenging examples that attempt to confuse the model, encouraging it to learn more robust representations and decision boundaries for scheduling-related tasks.

The system employs curriculum learning strategies during the training process. This approach involves gradually increasing the complexity of training examples, starting with simple scheduling scenarios and progressing to more complex multi-turn interactions. Curriculum learning helps the models develop a strong foundation in basic scheduling tasks before tackling more challenging scenarios.

The training process also incorporates multi-task learning techniques, where the AI models are trained simultaneously on multiple related tasks. The system jointly trains on intent classification, entity recognition, and response generation tasks. This approach allows the models to leverage shared representations and improve overall performance across different aspects of the scheduling process.

To enhance the adaptability of the AI models, the system implements continual learning mechanisms. These mechanisms allow the models to incrementally update their knowledge based on new interactions and feedback without forgetting previously learned information. This involves techniques such as elastic weight consolidation and gradient episodic memory to mitigate catastrophic forgetting during model updates.

The training process includes regularization techniques to prevent overfitting and improve generalization. This involves methods such as dropout, weight decay, and early stopping. These techniques ensure that the AI models perform well on unseen scheduling scenarios and maintain consistent performance across different user interactions.

To optimize the performance of the AI models, the training process employs hyperparameter tuning and neural architecture search. These approaches identify optimal model configurations and architectures for specific scheduling tasks, potentially leading to improved accuracy and efficiency in appointment management.

The system utilizes ensemble learning techniques during both training and inference. This involves training multiple models with different architectures or initializations and combining their predictions to make more robust scheduling decisions. Ensemble methods mitigate individual model weaknesses and provide more reliable scheduling outcomes.

The training process also incorporates techniques for handling imbalanced datasets, which are common in scheduling scenarios where certain types of appointments or interactions are more frequent than others. This involves methods such as oversampling, undersampling, and synthetic minority over-sampling technique (SMOTE) to ensure that the AI models learn to handle all types of scheduling requests effectively.

By employing these advanced AI model architectures and training techniques, the conversational appointment scheduling system develops robust and adaptive capabilities for natural language understanding, intent classification, and scheduling optimization. These approaches contribute to a more efficient and user-friendly appointment scheduling experience across various domains and use cases.

The AI-driven conversational appointment scheduling system facilitates comprehensive user interactions from initial contact through appointment confirmation. The interaction begins when a prospect initiates contact through a phone call, text message, or web-based interface, with the system greeting the prospect and prompting for their inquiry. For example, after the system's welcome message, a prospect requests to schedule a demonstration of a project management software. The system responds by asking for preferred timing. When the prospect indicates a preference for the following week's afternoons, the system checks availability and offers specific options such as Tuesday at 2:00 PM for a features overview, Wednesday at 3:30 PM for a comprehensive platform demonstration, and Thursday at 4:00 PM for an implementation discussion. Upon the prospect selecting Wednesday at 3:30 PM for the product demonstration, the system proceeds to collect the prospect's name and contact information before confirming the appointment details. The system then implements a brief delay to ensure real-time availability and prevent potential conflicts before finalizing the booking and providing confirmation details to the prospect.

The system handles more complex scenarios such as rescheduling or cancellation requests. For instance, when a prospect contacts the system to reschedule their existing cloud security solution demonstration, the system requests identifying information to locate the appointment in question. After confirming the current appointment details, the system asks for the prospect's new preferred timing and checks availability accordingly. When the prospect expresses interest in Friday afternoon and selects the 4:30 PM option from the available times offered for the security solution demonstration, the system processes the change after a brief pause to ensure availability. The system then confirms the rescheduled appointment, noting that the previous product demonstration has been cancelled, and informs the prospect that they will receive an updated confirmation email with the new demonstration details.

Throughout these interactions, the system employs natural language processing to interpret the prospect's requests and intent. The AI agent maintains context awareness, allowing for coherent multi-turn conversations and appropriate responses based on the prospect's previous inputs. The system also integrates with external calendar services to provide real-time availability information and ensure accurate scheduling.

The AI-driven system adapts to various scheduling scenarios, handling different types of appointments, time preferences, and rescheduling requests. It considers factors such as appointment duration, resource availability, and potential conflicts when suggesting time slots. The system also manages edge cases, such as last-minute changes or conflicting requests, by implementing verification periods and real-time availability checks.

By facilitating these comprehensive interactions for both initial bookings and subsequent modifications, the AI-driven conversational appointment scheduling system provides prospects with a seamless and efficient experience for managing their product demonstration appointments, enhancing prospect satisfaction and streamlining the sales process.

The AI-driven conversational appointment scheduling system integrates seamlessly with existing business infrastructure through robust API connections and data synchronization mechanisms. This integration allows the system to interface with customer relationship management (CRM) platforms, enterprise resource planning (ERP) systems, and other critical business applications. The system utilizes standardized data exchange formats and secure authentication protocols to ensure smooth communication between different components of the business ecosystem.

To handle multiple concurrent users, the system employs a distributed architecture that leverages cloud computing resources. This architecture enables horizontal scaling, allowing the system to dynamically allocate additional processing power and memory as user demand increases. Load balancing algorithms distribute incoming requests across multiple server instances, ensuring optimal resource utilization and preventing bottlenecks during peak usage periods.

The system incorporates advanced caching mechanisms to reduce database query latency and improve overall response times. Frequently accessed data, such as calendar availability information, is stored in high-speed memory caches, minimizing the need for repeated database lookups.

This caching strategy significantly enhances system performance, particularly when handling a large volume of concurrent scheduling requests.

To optimize database performance, the system utilizes indexing techniques and query optimization strategies. These techniques improve the speed of data retrieval operations, allowing the system to quickly access and process relevant scheduling information. Additionally, the system employs database sharding to distribute large datasets across multiple database instances, further enhancing scalability and reducing query execution times.

The system implements asynchronous processing for non-critical tasks, such as sending confirmation emails or updating analytics data. This approach allows the system to maintain responsiveness during high-load periods by offloading time-consuming operations to background processes. Asynchronous processing helps prevent user-facing delays and ensures smooth interaction even under heavy system load.

To enhance system reliability and fault tolerance, the appointment scheduling system utilizes redundant server configurations and data replication strategies. These measures ensure continuous operation in the event of hardware failures or network issues, minimizing downtime and maintaining service availability for users.

The system employs efficient data serialization and compression techniques to minimize network bandwidth usage. These optimizations reduce the amount of data transferred between system components and external services, improving overall system responsiveness and reducing latency in scheduling operations.

Content delivery networks (CDNs) are utilized to distribute static assets and reduce server load. This approach improves response times for users accessing the system from diverse geographic locations, ensuring consistent performance across different regions.

The appointment scheduling system incorporates auto-scaling capabilities that automatically adjust computing resources based on real-time usage patterns. This feature allows the system to scale up during periods of high demand and scale down during quieter periods, optimizing resource utilization and cost-efficiency.

To maintain system performance and reliability under various load conditions, the appointment scheduling system implements graceful degradation strategies. These strategies prioritize critical scheduling operations while temporarily limiting non-essential features during periods of extreme load or partial system failures.

The system stores conversation transcriptions and call logs in a secure manner for future training, debugging, and analytics purposes. These logs are saved on secure servers or S3 storage systems with strictly limited access, ensuring data privacy and compliance with relevant regulations. The stored data undergoes anonymization or pseudonymization processes to protect user privacy while still providing valuable insights for system improvement and analysis.

By implementing these integration and scalability features, the AI-driven conversational appointment scheduling system provides a robust and efficient solution capable of handling high volumes of concurrent users while maintaining performance and reliability across various load conditions.

A number of implementations have been described. Nevertheless, it will be understood that various modifications may be made without departing from the spirit and scope of the disclosure. Accordingly, other implementations are within the scope of the following claims.

The invention claimed is:

1. A computer-implemented method for managing memory allocation for appointment scheduling, the method comprising:

receiving, by a processor, an audio stream corresponding to a live conversation;

segmenting, by the processor, the audio stream into a sequence of time-based audio frames;

for each audio frame of the audio frames, generating, by the processor, a transcription and computing at least one of a speech-recognition confidence score associated with the transcription, and a domain-similarity score that quantifies semantic similarity between the transcription and a stored vocabulary using a cosine-distance function;

dynamically adjusting, by the processor, a predefined threshold for the speech recognition confidence score based on instantaneous processor-core utilization;

storing, in a working memory, the transcriptions for which at least one of the speech-recognition confidence score or the domain-similarity score exceeds the predefined threshold, the stored transcriptions being represented as fixed-length character encodings;

upon accumulation of a predetermined quantity of the stored transcriptions in memory, invoking, by the processor, a natural-language-understanding (NLU) model and supplying the stored transcriptions as input;

executing, by the processor, the NLU model to generate a structured intent representation that includes an appointment-booking intent and at least one time-related constraint;

querying, by the processor, an external calendar service for availability data based on the time-related constraint;

selecting, by the processor, a candidate time slot that satisfies the time-related constraint and is indicated as available in the availability data;

presenting, by the processor, the candidate time slot to a remote user within the live conversation; and upon receiving the remote user confirmation:

storing the candidate time slot in a memory location reserved for a provisional booking, monitoring calendar availability during a predetermined verification interval, converting the provisional booking to a confirmed appointment if no conflict is detected during the interval, and otherwise presenting an alternative time slot to the remote user within a same session;

wherein discarding low-relevance transcriptions prior to memory allocation and delaying invocation of the NLU model until the predetermined quantity of the stored transcriptions is accumulated to reduce transient memory usage and processor cycles during live interaction.

2. The method of claim 1, further comprising concurrently handling a plurality of live conversations on separate execution threads and, to prevent overlapping bookings, maintaining in cache-aligned shared memory a lock-free ring buffer whose entries each store a time-slot identifier and a status flag, the method further comprising:

writing, by each thread, the provisional booking record into the ring buffer using an atomic fetch-and-add operation; and promoting the status flag of the record to confirmed state via an atomic compare-and-swap operation only when no other confirmed record in the ring buffer has the same time-slot identifier.

3. The method of claim 2, wherein the ring buffer is dimensioned to occupy a single processor cache line, thereby allowing status-flag updates to complete without a cache-miss penalty.

4. The method of claim 1, wherein the stored vocabulary of appointment-related terms is compressed using a locality-sensitive-hashing structure to accelerate cosine-distance computation.

5. The method of claim 1, wherein the NLU model comprises a transformer-based sequence-to-sequence neural network distilled to a parameter footprint of less than 100 MB for edge deployment.

6. The method of claim 1, further comprising pre-fetching calendar availability data in the background while the NLU model executes.

7. The method of claim 1, wherein the time-related constraint includes an upper limit on start time and a minimum service duration.

8. The method of claim 1, further comprising generating a natural-language explanation of the confirmed appointment and transmitting the explanation as synthesized speech to the remote user.

9. A system for managing memory allocation for appointment scheduling, the system comprising:

at least one multi-core processor;

a memory coupled to the processor;

an audio interface configured to capture a live audio stream;

a non-transitory computer-readable medium storing instructions that, when executed by the processor, cause the system to:

receive an audio stream corresponding to a live conversation;

segment the audio stream into a sequence of time-based audio frames;

for each audio frame of the audio frames, generate a transcription and computing at least one of a speech-recognition confidence score associated with the transcription, and a domain-similarity score that quantifies semantic similarity between the transcription and a stored vocabulary using a cosine-distance function;

dynamically adjust a predefined threshold for the speech recognition confidence score based on instantaneous processor-core utilization;

store, in a working memory, the transcriptions for which at least one of the speech-recognition confidence score or the domain-similarity score exceeds the predefined threshold, the stored transcriptions being represented as fixed-length character encodings;

upon accumulation of a predetermined quantity of the stored transcriptions in memory, invoke a natural-language-understanding (NLU) model and supplying the stored transcriptions as input;

execute the NLU model to generate a structured intent representation that includes an appointment-booking intent and at least one time-related constraint;

query an external calendar service for availability data based on the time-related constraint;

select a candidate time slot that satisfies the time-related constraint and is indicated as available in the availability data;

present the candidate time slot to a remote user within the live conversation; and upon receiving the remote user confirmation; store the candidate time slot in a memory location reserved for a provisional booking, monitoring calendar availability during a predetermined verification interval, converting the provisional booking to a confirmed appointment if no conflict is detected during the interval, and otherwise presenting an alternative time slot to the remote user within a same session;

wherein discarding low-relevance transcriptions prior to memory allocation and delaying invocation of the NLU model until the predetermined quantity of the stored transcriptions is accumulated to reduce transient memory usage and processor cycles during live interaction.

10. The system of claim 9, wherein the memory includes a cache-aligned lock-free ring buffer whose entries each store a time-slot identifier and a status flag.

11. The system of claim 9, wherein the computer-readable medium further stores a transformer-based NLU model having fewer than 50 million trainable parameters.

12. The system of claim 9, wherein the audio interface comprises a digital signal processor that performs the segmentation of the audio stream into time-based frames in hardware.

13. The system of claim 9, further comprising a network interface that maintains persistent secure sockets to at least one external calendar service.

14. The system of claim 9, wherein the processor supports hardware-accelerated atomic fetch-and-add and compare-and-swap instructions used to implement the lock-free ring buffer.

\* \* \* \* \*